United States Patent
Bräuer et al.

(10) Patent No.: US 6,930,162 B2
(45) Date of Patent: Aug. 16, 2005

(54) CONTINUOUS PREPARATION OF THERMOPLASTICALLY PROCESSABLE POLYURETHANES

(75) Inventors: Wolfgang Bräuer, Leverkusen (DE); Herbert Heidingsfeld, Frechen (DE); Henricus Peerlings, Solingen (DE); Ludwig Trabert, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/643,856

(22) Filed: Aug. 19, 2003

(65) Prior Publication Data

US 2004/0198942 A1 Oct. 7, 2004

(30) Foreign Application Priority Data

Aug. 21, 2002 (DE) .................................. 102 38 112

(51) Int. Cl.⁷ .............................................. C08G 18/10
(52) U.S. Cl. .............................. 528/65; 528/72; 528/76; 528/83; 528/28
(58) Field of Search .............................. 528/65, 72, 76, 528/83, 28

(56) References Cited

U.S. PATENT DOCUMENTS

| 3,165,566 | A | * | 1/1965 | Murphy et al. .............. 264/184 |
| 3,642,964 | A | | 2/1972 | Rausch, Jr. ................... 264/40 |
| 3,963,679 | A | | 6/1976 | Ullrich et al. .......... 260/75 NE |
| 4,052,487 | A | | 10/1977 | Sturtz et al. ................. 260/945 |
| 4,102,830 | A | | 7/1978 | Sturtz et al. ................. 521/165 |
| 4,602,079 | A | * | 7/1986 | Vinches et al. ............... 528/60 |
| 5,795,948 | A | | 8/1998 | Heidingsfeld et al. ........ 528/59 |
| 6,323,299 | B1 | * | 11/2001 | Handlin et al. ............... 528/65 |

FOREIGN PATENT DOCUMENTS

| DE | 1 964 834 | | 7/1971 |
| DE | 26 10 980 | | 1/1978 |
| EP | 122894 | * | 10/1984 |
| GB | 1057018 | | 2/1967 |
| JP | 59179513 | * | 10/1984 |

* cited by examiner

*Primary Examiner*—Rachel Gorr
(74) *Attorney, Agent, or Firm*—Joseph C. Gil; N. Denise Brown

(57) ABSTRACT

The present invention relates to a multi-stage process for the continuous preparation of thermoplastically processable polyurethanes with improved processing properties based on various polyols.

8 Claims, No Drawings

CONTINUOUS PREPARATION OF THERMOPLASTICALLY PROCESSABLE POLYURETHANES

BACKGROUND OF THE INVENTION

The present invention relates to a multi-stage process for the continuous preparation of thermoplastically processable polyurethanes.

Thermoplastic polyurethanes (TPU) have been known for a long time. They are of industrial importance because of the combination of high-quality mechanical properties with the known advantages of inexpensive thermoplastic processability. A wide range of variation of the mechanical properties can be achieved by using various chemical builder components. An overview of TPUs, their properties and uses is given, for example, in Kunststoffe 68 (1978), pages 819 to 825 or in Kautschuk, Gummi, Kunststoffe 35 (1982), pages 568 to 584.

TPUs are built up from linear polyols, which are usually polyester- or polyether-polyols, organic diisocyanates and short-chain diols (i.e. chain lengtheners). A diversity of combinations of properties can be established in a targeted manner via the polyols. Catalysts can additionally be added to accelerate the formation reaction. The builder components can be varied in relatively wide molar ratios to establish the desired properties. Molar ratios of polyols to chain lengtheners of 1:1 to 1:12 have proved suitable. These result in products in the range from 70 Shore A to 75 Shore D.

Thermoplastically processable polyurethane elastomers can be built up either stepwise (e.g. by prepolymer metering process), or by simultaneous reaction of all the components in one stage (e.g. by one-shot metering process).

TPUs can be prepared continuously or discontinuously. The best known preparation processes are the belt process (see, for example, GB-A 1 057 018) and the extruder process (see, for example, DE-A 19 64 834, DE-A 23 02 564 and DE-A 20 59 570). In the extruder process, the starting substances are metered into a screw reactor, undergo polyaddition there and are converted into a uniform granule form. The extruder process is comparatively simple, but has the disadvantage that the homogeneity of the products prepared in this manner is inadequate for many uses because the mixing and reaction progress simultaneously. In addition, because of the limited reaction space and the limited metering possibilities, the variability in the targeted use of various polyols is limited.

The two-stage process described in, for example, EP-A 0 571 828, in which the prepolymer is built up from a polyol and a diisocyanate in a targeted manner in a tube reactor before the extruder, provided an improvement in respect of a targeted and controlled preparation of TPUs with improved processing properties. The TPU formation is concluded in the subsequent extruder with the addition of the chain lengthener. On the basis of the optimum conditions in each process stage, TPUs can thus be prepared in a targeted and controlled manner.

However, for many end-uses, it is not sufficient to use only one polyol in preparing the TPU. Particular combinations of TPU properties can be achieved by the simultaneous use of different polyols. An example which may be mentioned is the combination of polyester-polyols and polyether-polyols and the resulting advantages. By addition of particular phosphorus-containing polyols which can be built in, the flame resistance of the resultant TPU can be improved without adversely influencing other properties.

If the sometimes chemically very different polyols are reacted simultaneously by, e.g. the prepolymer process, or even together with the chain lengthener by, e.g. the one-shot process, with the diisocyanate in a continuous preparation process, tacky, poorly processable TPUs are probably obtained due to the reaction conditions no longer being optimum for all the starting substances.

The object of the present invention was thus to provide an economically favorable continuous process with which it is possible to prepare readily processable, homogeneous, non-tacky TPUs in an industrially simple manner.

Surprisingly, it has been possible to achieve this object by a continuous multi-stage preparation process.

SUMMARY OF THE INVENTION

The present invention provides a multi-stage process for the continuous preparation of thermoplastically processable polyurethane elastomers (TPUs) with tensile strengths of >30 MPa (measured in accordance with EN ISO 527-3). The present process comprises:

a) preparing a prepolymer I by reacting
   A) at least one organic diisocyanate, with
   B) a polyol 1 having on average at least 1.8 and not more than 3.0 Zerewitinoff-active hydrogen atoms and a number-average molecular weight $\overline{M}_n$ of 450 to 10,000, b) reacting said prepolymer I prepared in a) with
   C) a polyol 2, which is different than polyol 1, said polyol 2 having on average at least 1.8 and not more than 3.0 Zerewitinoff-active hydrogen atoms and a number-average molecular weight $\overline{M}_n$ of 60 to 10,000, thereby yielding a prepolymer II, wherein an equivalent ratio of NCO to the sum of NCO-reactive groups of from 1.2:1 to 10:1 is established, based on reaction components A), B) and C);

c) reacting, in a high-viscosity reactor operating with a high shear energy, said prepolymer II prepared in b), completely with
   D) at least one low molecular weight polyol or polyamine having on average at least 1.8 and not more than 3.0 Zerewitinoff-active hydrogen atoms and a number-average molecular weight $\overline{M}_n$ of 60 to 400 as a chain lengthener, wherein steps a) to c) are optionally carried out in the presence of F) catalysts, and optionally with the addition of E) from 0 to 20 wt. %, based on the total amount of TPU, of further auxiliary substances and additives, and with the overall equivalent ratio of NCO groups to the sum of NCO-reactive groups ranging from 0.9:1 to 1.2:1, based on the sum of all reaction components of steps a) to c).

Suitable organic diisocyanates to be used as component A) include, for example, aliphatic, cycloaliphatic, araliphatic, heterocyclic and aromatic diisocyanates, such as those which are described in, for example, Justus Liebigs Annalen der Chemie, 562, pages 75 to 136.

Specific examples which may be mentioned in detail include aliphatic diisocyanates such as, for example, hexamethylene-diisocyanate; cycloaliphatic diisocyanates such as, for example, isophorone-diisocyanate, 1,4-cyclohexane-diisocyanate, 1-methyl-2,4- and -2,6-cyclohexane-diisocyanate and the corresponding isomer mixtures, 4,4'-, 2,4'- and 2,2'-dicyclohexylmethane-diisocyanate and the corresponding isomer mixtures; and aromatic diisocyanates such as, for example, 2,4-toluylene-diisocyanate, mixtures of 2,4- and 2,6-toluylene-diisocyanate, 4,4'-diphenylmethane-diisocyanate, 2,4'-diphenylmethane-diisocyanate and 2,2'-diphenylmethanediisocyanate, mixtures of 2,4'-diphenylmethane-diisocyanate and 4,4'-diphenylmethane-diisocyanate, urethane-modified liquid 4,4'-diphenylmethane-diisocyanates and/or 2,4'-diphenylmethane-diisocyanates, 4,4'-diisocyanato-1,2-diphenyl-ethane and 1,5-naphthylene-diisocyanate. Diphenylmethane-diisocyanate isomer mixtures with a 4,4'-diphenylmethane-diisocyanate content of greater than 96 wt. % are preferably used, and 4,4'-diphenylmethane-diisocyanate and 1,5-naphthylene-diisocyanate are used in particular. The diisocyanates mentioned above can be used individually or in the form of mixtures with one another. They can also be used together with up to 15 mol % (calculated for the total diisocyanate) of a polyisocyanate, but polyisocyanate may be added at the most in an amount such that a thermoplastically processable product is formed. Examples of such polyisocyanates are triphenylmethane-4,4',4"-triisocyanate and polyphenyl-polymethylene-polyisocyanates.

The compounds suitable to be used as component B) in the present invention include, preferably, polyester polyols, polyether polyols or polycarbonate-polyols or polyols which contain nitrogen, phosphorus, sulfur and/or silicon atoms, or mixtures of these. Among the polyols which contain heteroatoms, phosphate-, phosphonate- and phosphine oxide-containing polyols are particularly preferred.

Linear hydroxyl-terminated polyols having on average from about 1.8 to about 3.0 Zerewitinoff-active hydrogen atoms per molecule, preferably from about 1.8 to about 2.2 Zerewitinoff-active hydrogen atoms per molecule, and having a molecular weight of 450 to 10,000 g/mol are preferably employed as component B) (i.e. polyol 1). These linear polyols often contain small amounts of non-linear compounds as a result of their production. Thus, these are also often referred to as "substantially linear polyols".

Suitable polyether-diols for component B) of the present invention can be prepared by, for example, reacting one or more alkylene oxides having 2 to 4 carbon atoms in the alkylene radical with a starter molecule which contains two active hydrogen atoms in bonded form. Alkylene oxides which may be mentioned include, for example, ethylene oxide, 1,2-propylene oxide, epichlorohydrin, 1,2-butylene oxide and 2,3-butylene oxide. Ethylene oxide, propylene oxide and mixtures of 1,2-propylene oxide and ethylene oxide are preferably used. The alkylene oxides can be used individually, alternately in succession or as mixtures. Possible starter molecules include, for example: water, amino alcohols including, for example, N-alkyl-diethanolamines such as, for example, N-methyl-diethanolamine; and diols such as, for example, ethylene glycol, 1,3-propylene glycol, 1,4-butanediol and 1,6-hexanediol. Mixtures of starter molecules can also optionally be employed. Suitable polyether-polyols also include the polymerization products of tetrahydrofuran which contain hydroxyl groups. It is also possible to employ trifunctional polyethers in amounts of 0 to 30 wt. %, based on the weight of the bifunctional polyethers. The amount of trifunctional polyethers used is limited to an amount which still results in a thermoplastically processable product being formed. The substantially linear polyether-diols of the present invention preferably have (number average) molecular weights of 450 to 5,000 g/mol. They can be used either individually or in the form of mixtures with one another.

Suitable polyester-diols to be used as component B) in the present invention can be prepared, for example, from dicarboxylic acids having 2 to 12 carbon atoms, preferably 4 to 6 carbon atoms, and polyhydric alcohols. Suitable dicarboxylic acids include, for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, e.g. in the form of a succinic, glutaric and adipic acid mixture. For the preparation of the polyester-diols it may be advantageous, where appropriate, to use the corresponding dicarboxylic acid derivatives, such as carboxylic acid diesters having 1 to 4 carbon atoms in the alcohol radical, carboxylic acid anhydrides or carboxylic acid chlorides, instead of the dicarboxylic acids. Examples of suitable polyhydric alcohols include glycols having 2 to 10, preferably 2 to 6 carbon atoms, such as, for example, ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols can be used by themselves or optionally as a mixture with one another, depending on the desired properties. Compounds which are also suitable for use as component B) include esters of carbonic acid with the diols mentioned above, and particularly those diols having 4 to 6 carbon atoms, such as 1,4-butanediol and/or 1,6-hexanediol, condensation products of ω-hydroxycarboxylic acids, such as ω-hydroxycaproic acid, and preferably polymerization products of lactones such as, for example, ω-caprolactones which are optionally substituted. Polyester-diols which are preferably used include ethanediol polyadipates, 1,4-butanediol polyadipates, ethanediol-1,4-butanediol polyadipates, 1,6-hexanediol-neopentylglycol polyadipates, 1,6-hexanediol-1,4-butanediol polyadipates and polycaprolactones. These polyester-diols preferably have (umber average) molecular weights of 450 to 5,000 g/mol, and can be used individually or in the form of mixtures with one another.

Linear hydroxyl-terminated polyols having on average 1.8 to 3.0 Zerewitinoff-active hydrogen atoms per molecule and having a molecular weight of 60 to 10,000 g/mol are also employed as component C) (polyol 2) in accordance with the present invention. The previously mentioned compounds which are described as being suitable for component B) can be used, with the proviso that polyol 2 is different than polyol 1.

Polyester-polyols, polyether-polyols and polycarbonate-polyols or mixtures of these compounds having a (number average) molecular weight of 100 to 5,000 g/mol and having on average 1.8 to 2.2 Zerewitinoff-active hydrogen atoms per molecule are particularly preferred as polyol (2).

Specific polyols which contain heteroatoms such as, for example, nitrogen-, phosphorus-, silicon- or sulfur-containing polyols can preferably also be employed. Phosphate-, phosphonate- or phosphine oxide-containing polyols having a molecular weight of 100 to 5,000 g/mol and having on average 1.8 to 2.2 Zerewitinoff-active hydrogen atoms per molecule are particularly preferred.

Compounds which are preferably employed as a phosphate are those which correspond to the general formula (I)

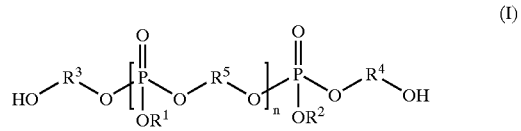

wherein:
R$^1$ and R$^2$: may be the same or different, and each independently represents a hydrogen atom, a branched or unbranched alkyl radicals having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

$R^3$, $R^4$ and $R^5$: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms; and n: represents a number from 0 to 100.

Compounds which are preferably employed as a phosphonate are those which correspond to the general formula (II)

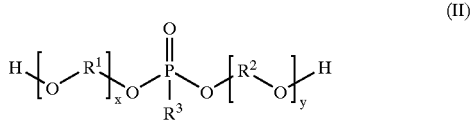

(II)

wherein:

$R^1$ and $R^2$: may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms;

$R^3$: represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms; and x and y: each independently represents a number of from 1 to 50, preferably from 2 to 40.

Compounds which can also preferably be employed as a phosphonate are those which correspond to the general formula (III)

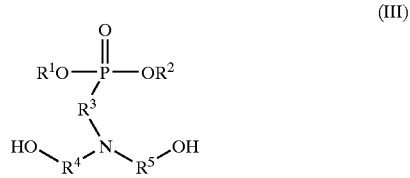

(III)

wherein:

$R^1$ and $R^2$: may be the same or different, and each independently represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms;

$R^3$ represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms; and $R^4$ and $R^5$ may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms.

Compounds which are preferably employed as a phosphine oxide are those which correspond to the general formula (IV):

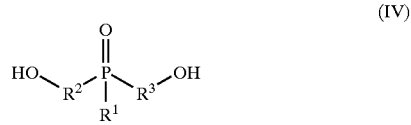

(IV)

wherein:

$R^1$ represents a hydrogen atom, a branched or unbranched alkyl radical having 1 to 24 carbon atoms, a substituted or unsubstituted aryl radical having 6 to 20 carbon atoms, a substituted or unsubstituted aralkyl radical having 6 to 30 carbon atoms, or a substituted or unsubstituted alkaryl radical having 6 to 30 carbon atoms; and $R^2$ and $R^3$ may be the same or different, and each independently represents a branched or unbranched alkylene radical having 1 to 24 carbon atoms, a substituted or unsubstituted arylene radical having 6 to 20 carbon atoms, a substituted or unsubstituted aralkylene radical having 6 to 30 carbon atoms, or a substituted or unsubstituted alkarylene radical having 6 to 30 carbon atoms.

Chain-lengthening agents suitable for use as component D) which are employed in the present invention include low molecular weight polyols or polyamines having on average 1.8 to 3.0 Zerewitinoff-active hydrogen atoms per molecule and a (number average) molecular weight of 60 to 400 g/mol. These low molecular weight compounds preferably include aliphatic diols having 2 to 14 carbon atoms such as, for example, ethanediol, 1,6-hexanediol, diethylene glycol, dipropylene glycol and, in particular, 1,4-butanediol. However, diesters of terephthalic acid with glycols having 2 to 4 carbon atoms, such as e.g. terephthalic acid bis-ethylene glycol or terephthalic acid bis-1,4-butanediol; hydroxyalkylene ethers of hydroquinone, such as e.g. 1,4-di(β-hydroxyethyl)-hydroquinone; ethoxylated bisphenols, such as e.g. 1,4-di(β-hydroxyethyl)-bisphenol A; (cyclo)aliphatic diamines, such as e.g. isophoronediamine, ethylenediamine, 1,2-propylene-diamine, 1,3-propylenediamine, N-methyl-propylene-1,3-diamine and N,N'-dimethyl-ethylenediamine; and aromatic diamines, such as e.g. 2,4-toluylenediamine and 2,6-toluylenediamine, 3,5-diethyl-2,4-toluylenediamine or 3,5-diethyl-2,6-toluylenediamine, and primary mono-, di-, tri- and/or tetraalkyl-substituted 4,4'-diaminodiphenylmethanes, are also suitable. Mixtures of the abovementioned chain lengtheners can also be employed. In addition, relatively small amounts of triols can also be added.

Although it is possible, at least theoretically, to use the same compound as polyol 2 and as chain lengthening agent, these compounds are different in actual use.

Conventional monofunctional compounds can furthermore also be employed in small amounts, e.g. as chain terminators or mold release aids. Examples which may be mentioned are alcohols, such as octanol and stearyl alcohol, or amines, such as butylamine and stearylamine.

To prepare the TPUs of the present invention, the builder components, optionally in the presence of catalysts, auxiliary substances and/or additives, are preferably reacted in amounts such that the equivalent ratio of NCO groups from A) to the sum of NCO-reactive groups, in particular the OH (and/or NH) groups of the low molecular weight compounds D) and the polyols B) and C), is from 0.9:1.0 to 1.2:1.0, and preferably from 0.95:1.0 to 1.10:1.0.

Suitable catalysts to be used as component F) in the present invention include the conventional tertiary amine catalysts known from the prior art. Examples of suitable catalysts include tertiary amine compounds such as, for example, triethylamine, dimethylcyclohexylamine, N-methylmorpholine, N,N'-dimethyl-piperazine, 2-(dimethylamino-ethoxy)-ethanol, diazabicyclo-(2,2,2)-octane and the like, and, in particular, organometallic compounds, such as titanic acid esters, iron compounds or tin compounds, e.g. tin diacetate, tin dioctoate, tin dilaurate or the tin-dialkyl salts of aliphatic carboxylic acids, such as dibutyltin diacetate or dibutyltin dilaurate or the like. Preferred catalysts are organometallic compounds, in particular titanic acid esters and compounds of iron and/or tin.

In addition to the TPU components and the catalysts, auxiliary substances and/or additives, referred to here as component E), may be present in amounts of up to 20 wt. %, based on the total weight of the TPU. These auxiliary substances and/or additives can be dissolved in one of the TPU components, preferably in component B), or they may also optionally be metered in, after the reaction has taken place, in a subsequent mixing unit such as, e.g. an extruder.

Examples of these auxiliary substances and/or additives which may be mentioned include lubricants, such as fatty acid esters, metal soaps thereof, fatty acid amides, fatty acid ester-amides and silicone compounds, antiblocking agents, inhibitors, stabilizers against hydrolysis, light, heat and discoloration, flameproofing agents, dyestuffs, pigments, inorganic and/or organic fillers and reinforcing agents. Reinforcing agents include, in particular, fibrous reinforcing substances, such as e.g. inorganic fibers, which are prepared according to the prior art and can also be charged with a size. Further details of the auxiliary substances and additives mentioned can be found in the technical literature, for example, in the monograph by J. H. Saunders and K. C. Frisch "High Polymers", volume XVI, Polyurethane, part 1 and 2, Verlag Interscience Publishers 1962 and 1964, the Taschenbuch für Kunststoff-Additive by R. Gächter and H. Müller (Hanser Verlag Munich 1990) or in DE-A 29 01 774, the disclosure of which is herein incorporated by reference.

Further additives which can be incorporated into the TPU are thermoplastics such as, for example, polycarbonates and acrylonitrile/butadiene/styrene terpolymers, and in particular, ABS. Other elastomers, such as rubber, ethylene/vinyl acetate copolymers, styrene/butadiene copolymers and other TPUs, can also be used. Furthermore, commercially available plasticizers, such as phosphates, phthalates, adipates, sebacates and alkylsulfonic acid esters, are also suitable for incorporation.

The preparation process according to the invention is preferably carried out as follows.

The components A) and B) in step a) are mixed continuously at temperatures above their melting point, preferably at temperatures of 50 to 220° C., and reacted to form prepolymer I. This stage is preferably carried out in a mixing unit with a high shear energy. For example, a mixing head or a high-speed tubular mixer, a nozzle or a static mixer can be used. Static mixers which can be employed include those which are disclosed in, Chem.-Ing. Techn. 52, no. 4, page 285 to 291, and in "Mischen von Kunststoff und Kautschukprodukten", VDI-Verlag, Düsseldorf 1993, the disclosures of which are herein incorporated by reference. SMX static mixers from Sulzer may be mentioned by way of example.

In another embodiment, a tube can also be used as the reactor for the reaction.

The reaction to form prepolymer I in step a) should substantially be brought to complete conversion (with respect to polyol 1). Preferably, more than 85 mol % of the polyol employed should be reacted in this stage. The reaction temperatures should be above 100° C., preferably between 120° C. and 250° C. For the continuously operating process the volume of the reactor is such that, in interaction with the reaction temperature and throughput, the required conversion is ensured.

Preferably, in step b), component B) (i.e. polyol 2) which is preheated to above its melting point, is mixed continuously into prepolymer I with a high shear energy and the mixture allowed to react to yield prepolymer II. The above mentioned reactors can also be used for this stage. A reactor separated from stage a) is preferably used for this stage.

In addition, for step b), the volume of the reactor is such that, in interaction with the reaction temperature and the throughput, a conversion of greater than 85 mol % of the amount of polyol 2 employed is ensured.

In a particular embodiment, this stage can also be carried out in a first part of a multi-screw extruder (e.g. a twin-screw extruder ZSK).

Adding together all the reaction components, i.e. components A), B) and C), of steps a) and b), an equivalent ratio of NCO groups to the sum of NCO-reactive groups of 1.2:1 to 10:1 is preferably established.

In step c), the prepolymer II is preferably mixed continuously with the low molecular weight polyol or polyamine as the chain lengthener, and allowed to react to yield the TPU in a high-viscosity reactor.

Component D), the chain lengthener, is preferably mixed in using a mixing unit which operates with a high shear energy. Examples of such units which may be mentioned include a mixing head, a static mixer, a nozzle or a multi-screw extruder. The mixing and the reaction of the components of this stage are preferably carried out in a multi-screw extruder (e.g. in a twin-screw kneader ZSK) after step b).

Reaction step c) is preferably carried out in a reactor which differs from the reactor used in steps a) and b) (different type of reactor).

The temperatures of the extruder housing are selected such that the reaction components are brought to complete conversion, and the possible incorporation of the above mentioned auxiliary substances or the optional components can be carried out with the highest possible protection of the product.

At the end of the extruder the product is granulated. Readily processable granules are obtained.

The TPU prepared by the process according to the invention can be processed to injection-molded articles and to homogeneous extruded articles.

The invention is to be illustrated in more detail with the aid of the following examples.

EXAMPLES

The following recipe was used in the working examples. TPU recipe:

| Polyol 1: | Terathane ® 1000 | 52.3 parts by wt. |
| Polyol 2: | Exolit ® OP 560 | 5.5 parts by wt. |
| Chain lengthener: | Butane-1,4-diol | 6.2 parts by wt. |

-continued

| Isocyanate: | 4,4'-MDI | 35.1 parts by wt. |
| Additives: | Licowax ® C | 0.4 part by wt. |
| | Irganox ® 1010 | 0.5 part by wt. |
| | Tin dioctoate | 0.011 part by wt. |

| Terathane ® 1000: | Polyether having a number average molecular weight of $M_n$ of 1,000 g/mol; a commercial product of Du Pont de Nemours |
| Isocyanate: | Diphenylmethane-4,4'-diisocyanate, commercially available from Bayer AG |
| Exolit ® OP 560: | Flameproofing agent based on diol-phosphonate having a number average molecular weight of $M_n$ of 300, commercially available from Clariant GmbH |
| Irganox ® 1010 | Tetrakis(methylene-(3,5-di-tert-butyl 4-hydroxycinnamate))-methane, commercially available from Ciba Specialty Chemicals Inc. |
| Licowax ® C | Ethylene-bis-stearylamide, commercially available from Clariant |

Example 1

Comparison (ZSK One-Shot Process)

Polyol 1, in which tin dioctoate was dissolved as a catalyst, was heated to 200° C. and metered continuously by means of a gear pump into the first housing of a ZSK 53 (twin-screw extruder from Werner/Pfleiderer).

Polyol 2 premixed with the butane-1,4-diol (60° C.), and 4,4'-diphenylmethane-diisocyanate (Desmodur® 44M) (60° C.) and Licowax® C were metered continuously into the same housing, i.e. the first housing of the ZSK 53. The ZSK was heated up to 220 to 230° C. (housings 1 to 8). The last 4 housings were cooled. The speed of the screw was 290 rpm.

At the end of the screw the hot melt was taken off as a strand, cooled in a water-bath and granulated.

Example 2

Comparison (ZSK Prepolymer Metering Process)

This experiment was carried out analogously to Example 1, except that polyol 2 and the butane-1,4-diol were metered into housing 7 of the ZSK, instead of into housing 1 as above.

Example 3

Comparison (Two-Stage Process)

This experiment was carried out analogously to Example 1, except that polyol 1 and the MDI were metered continuously into a static mixer of a static mixer zone of 3×DN 20 (SMX from Sulzer). This static mixer zone led directly into housing 1 of the ZSK. The remaining components were mixed and/or metered as in Example 1.

Example 4

According to the Invention (Multi-Stage Prepolymer Metering Process)

This experiment was carried out analogously to Example 3, except that the continuous addition and reaction of polyol 2 was carried out in a reactor consisting of a DN 18 static mixer and a tube (length-diameter ratio: 80). This reactor was mounted directly after the static mixer zone from Example 3 and led directly into housing 1 of the ZSK. The remaining components were mixed and/or metered as in Example 3.

The results of the product testing are shown in the table.

Measurement of the MVR Values (MVR=Melt Volume Rate)

The MVR value of the granules was measured in accordance with ISO 1133 with a weight of 10 kg.

Production of the Injection-Molded Articles

The particular TPU granules from Examples 1 to 4 were melted (melt temperature approx. 230° C.) in an injection molding machine D 60 (32 screw from Mannesmann) and shaped into sheets (125 mm×50 mm×2 mm).

Tube Extrusion

The particular TPU granules from Examples 3 and 4 were melted (metering 3 kg/h; 230 to 195° C.) in a single-screw extruder 30/25D (Plasticorder PL 2000-6 from Brabender) and extruded to a tube through a tube die.

Mechanical Testing at Room Temperature

The modulus at 100% elongation and the tear strength were measured on the injection-molded test specimens in accordance with DIN 53 405.

Determination of the Flameproofing Properties:

The flameproofing properties were determined in accordance with UL94 V at a thickness of the test specimen of 3 mm (described in Underwriters Laboratories Inc. Standard of Safety, "Test for Flammability of Plastic Materials for Parts in Devices and Appliances", p. 14 et seq., Northbrook 1998 and J. Triotzsch, "International Plastics Flammability Handbook", p. 346 et seq., Hanser Verlag, Munich 1990).

In this test a V 0 rating means non-burning dripping. A product with this rating is therefore designated as flame-resistant. A V 2 rating means burning dripping, i.e. absence of flame resistance.

Results:

| Example | Reactor: Static Mixer Extruder | Metering of polyol 1 | Metering of polyol 2 | Metering of Chain Lengthener D | Metering of MDI | Granules | MVR 200° C. 10 kg | 100% Modulus [MPa] | Tear strength [MPa] | UL 94 test (3 mm) | Tube extrusion |
|---|---|---|---|---|---|---|---|---|---|---|---|
| 1* | ZSK 53 | hous. 1 ZSK | hous. 1 ZSK | hous. 1 ZSK | hous. 1 ZSK | tacky | 20 | 6.7 | 39 | V 2 | |
| 2* | ZSK 53 | hous. 1 ZSK | hous. 7 ZSK | hous. 7 ZSK | hous. 1 ZSK | very tacky; cannot be processed | 42 | | | | |
| 3* | 3 × DN20/ ZSK 53 | 1st DN20 | hous. 1 ZSK | hous. 1 ZSK | 1st DN20 | tacky | 25 | 6.2 | 47 | V 0 | inhomogeneous extrudate |

-continued

| Example | Reactor: Static Mixer Extruder | Metering of polyol 1 | Metering of polyol 2 | Metering of Chain Lengthener D | Metering of MDI | Granules | MVR 200° C. 10 kg | 100% Modulus [MPa] | Tear strength [MPa] | UL 94 test (3 mm) | Tube extrusion |
|---|---|---|---|---|---|---|---|---|---|---|---|
| 4* | 3 × DN20/ 1 × DN18/ tube/ ZSK 53 | 1st DN20 | 1st DN18 | hous. 1 ZSK | 1st DN20 | not tacky, readily granulated | 7 | 6.7 | 48 | V 0 | homogeneous extrudate |

*comparison example not according to the invention
hous. = housing
ZSK 53 = (twin-screw kneader from Werner/Pfleiderer)
3 × DN20 = static mixer of three DN20 static mixers from Sulzer
1 × DN18 = one static mixer DN18 from Sulzer The TPU granules prepared by the one-shot process (Example 1) were tacky and achieved a rating of only V2 in the flame test. Tackiness of granules makes their further processing and their handling (e.g. conveying, transfer to containers etc.) difficult.

The products prepared by the ZSK prepolymer process were so severely tacky that it was not possible to process them (Example 2).

The TPU products prepared by the two-stage prepolymer process (Example 3) were also tacky. Inhomogeneous extruded tubes were obtained by processing.

The granules prepared by the multi-stage process according to the invention (Example 4), on the other hand, were not tacky and could be processed very readily to TPU articles (e.g. extruded tubes) with excellent TPU properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multi-stage process for the continuous preparation of thermoplastically processable polyurethane elastomers (TPU) with tensile strengths of >30 MPa (measured in accordance with EN ISO 527-3), comprising
    a) preparing a prepolymer I by reacting
        A) at least one organic diisocyanate, with
        B) a polyol 1 having on average at least 1.8 and not more than 3.0 Zerewitinoff-active hydrogen atoms and a number-average molecular weight $\overline{M}_n$ of 450 to 10,000;
    b) reacting said prepolymer I prepared in a) with
        C) a polyol 2 comprising an organic phosphorus-containing compound, which is different than polyol 1, wherein said polyol 2 has on average at least 1.5 and not more than 2.5 Zerewitinoff-active hydrogen atoms and a number-average molecular weight $\overline{M}_n$ of 100 to 5.000, and polyol 2 being present in an amount of 0.01 to 50 wt. %, based on the total amount of TPU,
        to yield a prepolymer II, wherein an equivalent ratio of NCO groups to the sum of NCO-reactive groups of from 1.2:1 to 10:1 is established, based on reaction components (A), (B) and (C);
    c) reacting, in a high-viscosity reactor operating with a high shear energy, said prepolymer II prepared in b) completely with:
        D) at least one low molecular weight polyol or polyamine having on average at least 1.8 and not more than 3.0 Zerewitinoff-active hydrogen atoms and a number-average molecular weight $\overline{\overline{M}}_n$ of 60 to 400 as a chain lengthener;
    wherein steps a) to c) are optionally carried out in the presence of F) catalysts, and optionally, with the addition of E) 0 to 20 wt. %, based on the total amount of TPU, of further auxiliary substances and additives, with the overall equivalent ratio of NCO groups to the sum of NCO-reactive groups being from 0.9:1 to 1.2:1, based on the sum of all the reaction components of steps a) to c).

2. The process of claim 1, wherein B) said polyol 1 and C) said polyol 2, both of which contain Zerewitinoff-active hydrogen atoms, are selected from the group consisting of (i) polyester-polyols, (ii) polyether-polyols, (iii) polycarbonate-polyols, (iv) polyols which contain nitrogen, phosphorus, sulfur and/or silicon atoms and (v) mixtures thereof.

3. The process of claim 1, wherein D) said low molecular weight polyols containing Zerewitinoff-active hydrogen atoms comprises ethylene glycol, butanediol, hexanediol, 1,4-di-(β-hydroxyethyl)-hydroquinone, or 1,4-di-(β-hydroxyethyl)-bisphenol A.

4. The process of claim 1, wherein A) said organic diisocyanate comprises an aromatic diisocyanate.

5. The process of claim 4, wherein said aromatic diisocyanate comprises a diphenylmethane-diisocyanate isomer mixture having a 4,4'-diphenylmethane-diisocyanate content of >96 wt. %.

6. The process of claim 1, wherein steps a) and b) are carried out in separate reactors.

7. The process of claim 1, wherein step c) is carried out in a separate reactor than steps a) and b).

8. The process of claim 1, wherein step c) is carried out in a multi-screw extruder.

* * * * *